United States Patent Office 2,863,868
Patented Dec. 9, 1958

2,863,868

MONO ORTHOPHOSPHORIC ESTERS AND SALTS THEREOF

Pierre Chabrier and André E. G. Desjobert, Paris, France, assignors to Jan M. D. Aron-Samuel, Suresnes, France No Drawing. Application December 21, 1953
Serial No. 399,594

Claims priority, application France May 30, 1949

4 Claims. (Cl. 260—247.7)

This application is a continuation-in-part of our co-pending U. S. patent application Serial No. 164,623, filed May 26, 1950, now abandoned.

Elements, particularly metals, as are employed for therapeutic purposes, are generally administered in combined form, particularly as salts, but in many cases, the only salts that can be used in practice are insoluble in water; it is then necessary to associate the salts with vehicles, whether solvents or not, the administration of which entails difficulties particularly that of being painful. It is an object of our invention to provide new orthophosphoric acid compounds capable of producing water-soluble salts with various metals, and the aqueous solutions of which bear the double advantage of being stable and substantially neutral.

A further object is to provide salts of the above type in which phosphorus is in readily assimilable form and associated with metals, especially calcium, known as desirable for therapeutic purposes, particularly to provide salt compositions suitable for oral administration as well as aqueous salt solutions suitable for intravenous administration.

The new compounds according to this invention belong to the class of mono-esters of orthophosphoric acid. In that class, as far as we are aware, the mono-esters described and employed up to this time mainly are alkyl and aralkyl orthophosphates; few alcohols having additional groups have been mono-esterified with orthophosphoric acid.

According to this invention, we provide new mono-esters of orthophosphoric acid and tertiary-amino-alcohols in which the aliphatic chain may optionally bear additional substituents.

In actual practice, we prefer mono-esters in which the aliphatic chain is that of lower alcohols readily available in industry.

The two substituents linked with the nitrogen atom may be the same or different, or form a heterocycle therewith which may contain further heteroatoms in addition to said nitrogen atom. For example the substituents may be alkyl, aryl, aralkyl, morpholino, piperidino or like groups.

As additional substituents, the aliphatic chain having a tertiary-amino group may, in particular, bear one or more hydroxy groups.

According to this invention we further provide salts of the mono-esters above identified, particularly alkali metal salts, alkaline earth metal salts and salts of other metals such as iron, copper, bismuth and the like, as well as quaternary derivatives of said mono-esters and salts thereof.

Among the products provided according to our invention, we shall mention by way of example β-dimethylamino ethyl, β-diethylamino-ethyl, β-morpholino-ethyl and β-piperidino-ethyl mono-orthophosphate, salts and quaternary derivatives thereof, particularly methyliodides and camphomethylates; we shall further cite γ-dialkyl-amino-β-hydroxypropyl mono-orthophosphates, salts and quaternary ammonium derivatives thereof, particularly methyliodides.

Generally speaking, the products provided in accordance with our invention can be employed to therapeutics; some of them can also be used as plasticizers or insecticides.

We have found that the calcium salts of the mono-β-morpholino-ethyl ester of orthophosphoric acid and mixtures thereof are particularly desirable for phosphocalcitherapy because, unlike known calcium salts, they cause calcemia and phosphoremia levels in blood which remain high for a long time instead of rapidly falling after having reached a maximum. Furthermore calcium is better retained in the organism if administered in the form of calcium morpholino ethyl phosphate as apparent from the variations of the calciuria level.

For parenteral administration, the calcium acid salt is preferably employed in view of its better solubility in water and thus to yield injectable aqueous solutions; it is still more desirable for parenteral, particularly intravenous, administration to employ a mixture of about 70 parts by weight of the calcium acid salt with about 30 parts by weight of the calcium neutral salt, as an aqueous solution, thereof, for example a 10 percent solution, firstly because such a solution is substantially neutral, its pH-value ranging between 6.5 and 7.0, secondly because the calcium neutral salt has a higher calcium content than the acid salt. Mixtures of salts having a less neutral salt content as well as the calcium acid salt alone may likewise be employed in aqueous solution.

For oral administration the calcium acid salt and mixtures of calcium acid and neutral salts may be employed as aqueous solutions thereof. The calcium neutral salt alone or mixtures of neutral and acid salts having a predominating content of the neutral salt which is less soluble in water, are preferably employed in solid powder form, together with a carrier, for example as tablets or cachets.

For the production of the above mono-esters, we may according to this invention, cause anhydrous orthophosphoric acid to react directly with the tertiary-amino-alcohol, preferably in the presence of phosphorus pentoxide and with exclusion of moisture. We may also react a water-soluble trimetal orthophosphate, for example tertiary sodium orthophosphate, with a tertiary-amono-alkyl halide corresponding to the amino-alcohol, or a hydrohalide thereof, in an aqueous medium, an equimolar amount of alkali being added where a hydrohalide is employed.

As a modification, we may start from poly-phosphoric acids as produced by dehydrating orthophosphoric acid (commercial solution thereof) at an elevated temperature, instead of orthophosphoric acid; in that case it is not necessary to work in the presence of phosphorus pentoxide.

The following examples which are not limiting will illustrate our invention and the manner of carrying the same into effect, the parts being by weight.

*Example 1.*—7 parts of phosphorus pentoxide were added to 40 parts of anhydrous orthophosphoric acid and the mixture was stirred until it was homogeneous; 6 parts of diethylaminoethanol were then stirred into the mixture by small portions.

The mixture was then heated to 110–115° C. for 8 hours in a vessel communicating with atmosphere through a filter preventing access of atmospheric moisture, for example a column of anhydrous calcium chloride bits.

With a view to isolating the ester produced from the crude reaction mixture, we found that the more convenient process is to form an intermediary, neutral barium salt as will be described later on.

The crude reaction mixture after cooling was poured into water (about 1500 parts), calcium carbonate was added gradually to the dilute solution thus obtained until effervescence ceased, then neutralisation of phosphoric acid was completed by adding lime milk until a blue colour was obtained with thymolphthalein.

The precipitate of tertiary calcium phosphate was filtered off, and an equal volume of 95 percent (by volume) alcohol was added to the filtrate for precipitating the neutral calcium salt of β-diethylamino-ethyl mono-orthophosphate. The salt was thoroughly dehydrated in a vacuo and after estimation of elements P, Ca, N, an analysis of the isolated salt, led us to attributing it the following formula:

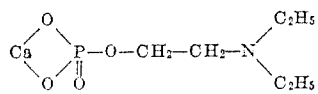

By substituting barium carbonate and baryte for calcium carbonate and lime and working in similar condition, we obtained the corresponding neutral barium salt.

In both cases, the yield amounted to 55–65%.

For isolating β-diethylaminoethyl mono-orthophosphate it is convenient as above indicated to start from a salt thereof, particularly barium salts.

Into an aqueous solution of barium acid salt or an aqueous suspension of barium neutral salt, sulphuric acid was stirred by an amount exactly calculated for binding the whole content of barium; with a view to facilitating mechanical stirring, we found it desirable to work in the presence of inert bodies such as glass balls.

When the operation was completed (which required about 3 hours in the presence of glass balls), the precipitate of barium sulphate was filtered off, and the aqueous filtrate concentrated in a vacuo; we thus obtained β-diethyl-aminoethyl mono-orthophosphate as a sirupy liquid.

The neutral salts thus produced were stable in aqueous solution at 100° C.; at the same temperature, the acid salts were partly hydrolyzed but they were stable at room temperature.

*Example 2.*—14 parts of β-diethylamino ethyl chloride dissolved in 30 parts of water were added to 15 parts of tertiary sodium phosphate dissolved in 30 parts of water, and the solution was left standing at room temperature for 48 hours.

Unesterified phosphoric acid in the solution was then estimated and calcium acetate was added to the solution as a 20 percent aqueous solution, by the amount exactly calculated for precipitating free phosphoric acid as tertiary calcium phosphate. The latter was filtered off, and calcium acetate (again as a 20 percent aqueous solution) was added to the filtrate by an equimolar amount reckoned on orthophosphoric ester in the solution. An equal volume of 95 percent alcohol was then added to the aqueous solution, so as to cause precipitation of calcium neutral salt.

The yield amounted to 55–65%.

By substituting barium acetate for calcium acetate barium neutral salt was obtained by the same procedure; acid salts were produced and mono-orthophosphoric ester was isolated as in Example 1.

For preparing alkali or other metal salts of β-diethylaminoethyl mono-orthophosphate, the ester may be reacted directly with the metal hydroxide in stoichiometric proportion, or a double decomposition may be effected between an alkali or alkaline earth salt of the ester dissolved in water and a properly selected, water soluble salt of the metal to be bound; it is desirable to select a metal salt the anion of which gives with the alkali or alkaline earth metal, a salt capable of precipitating or otherwise forming a distinct, easily separable phase.

For example, with a view to preparing the ferrous salt, ferrous sulphate and calcium or barium acid salt of β-diethylaminoethyl mono-orthophosphate may be reacted in aqueous medium, and the precipitate of calcium or barium sulphate filtered off. Aqueous solutions of the ferrous salt thus produced are remarkably stable. In that salt, the proportion between the number of phosphorus atoms and the number of iron atoms is substantially equal to two; the salt is remarkably stable, chiefly away from atmospheric air.

By substituting copper sulphate for iron sulphate, the corresponding copper salt was obtained in the same way.

Likewise we obtained mercury, bismuth, silver, zinc and like salts by the same procedure, all of which are soluble in water.

*Example 3.*—β - Morpholino - ethyl mono orthophosphate was prepared either according to Example 1, from phosphoric acid, and according to Example 2, from tertiary sodium phosphate, equivalent proportions being adopted.

In the second case, we found it desirable to employ as an alkylating agent, β-morpholino-ethyl chloride hydrochloride prepared for example by reacting thionyl chloride with β-morpholino-ethanol. In that case, it was necessary to add as much alkali as is required for setting free the chloride of β-morpholino-ethyl chloride.

Working as described in example 2, we produced successively (*a*) β-Morpholino-ethyl mono-orthophospate

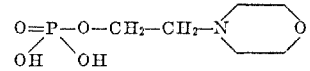

which might be isolated as a crystalline solid having a melting point of 145–147° C. (measured on the Maquenne block)

(*b*) Calcium and barium neutral salts thereof after complete dehydration in a vacuo, for example

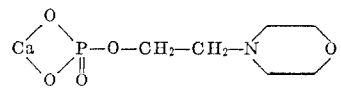

(*c*) Water soluble and salts of the general formula

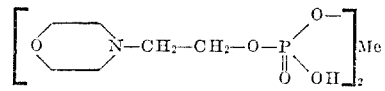

wherein Me stands for a divalent metal, in particular

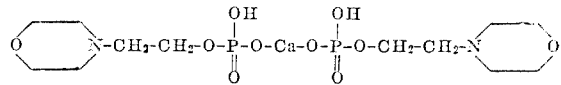

The calcium acid salt is soluble in water, its solubility decreasing as the temperature rises. The calcium neutral salt is less soluble in water.

*Example 4.*—As already indicated in Example 3 in connection with the morpholino compound, it is possible to prepare β-piperidino-ethyl mono-orthophosphate according to two different ways, viz. from β-piperidino-ethanol and from say hydrochloride of β-piperidino-ethyl chloride.

Following the same procedure, we prepared said mono-orthophosphate

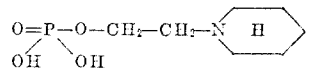

in the form of a syrupy liquid, as well as neutral and acid salts thereof.

*Example 5.*—Working either according to Example 1, from γ-morpholino-β-hydroxy-propanol, or according to Example 2, from hydrochloride of γ-morpholino-β-hydroxy-propyl chloride, we obtained under similar conditions γ - morpholino-β - hydroxypropyl mono - orthophosphate

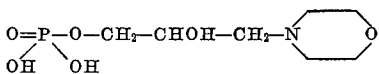

and neutral and acid salts thereof. The salts of said morpholino hydroxy-propyl mono-orthophosphate are generally less soluble in water than the salts of the compounds described in the foregoing examples.

What we claim is:

1. A calcium salt of the mono β-morpholino-ethyl ester of orthophosphoric acid.

2. The calcium acid salt of the mono-β-morpholino-ethyl ester of orthophosphoric acid, said salt having the following formula

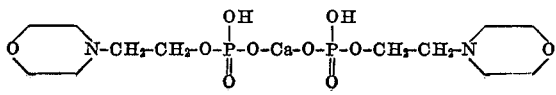

3. The calcium neutral salt of the mono-β-morpholino-ethyl ester of orthophosphoric acid, said salt having the following formula

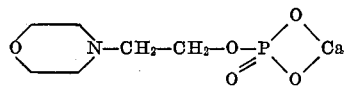

4. A mixture of about 70 parts by weight of the calcium acid salt of the mono-β-morpholino-ethyl-ester of orthophosphoric acid, with about 30 parts by weight of the calcium neutral salt of the mono-β-morpholino-ethyl-ester of orthophosphoric acid, said mixture yielding aqueous solutions having a pH-value between 6.5 and 7.0.

References Cited in the file of this patent

Cherbuliez: Helv. Chim. Acta, vol. 29, pages 2006-17 (1946).